M. C. MURPHY & M. C. MURPHY, Jr.
CHART FOR USE IN CUTTING GARMENTS.
APPLICATION FILED FEB. 27, 1915.

1,173,301.  Patented Feb. 29, 1916.

WITNESSES:
Edward A. Breed,
Harry C. Daggett.

INVENTORS,
Mary Caroline Murphy,
Mary Caroline Murphy, Jr.,
BY Allen & Daggett,
ATTORNEYS.

UNITED STATES PATENT OFFICE.

MARY CAROLINE MURPHY AND MARY CAROLINE MURPHY, JR., OF HAVERHILL, MASSACHUSETTS.

CHART FOR USE IN CUTTING GARMENTS.

1,173,301.   Specification of Letters Patent.   Patented Feb. 29, 1916.

Application filed February 27, 1915.  Serial No. 11,053.

*To all whom it may concern:*

Be it known that we, MARY CAROLINE MURPHY and MARY CAROLINE MURPHY, Jr., both citizens of the United States, and both residents of Haverhill, in the county of Essex, in the State of Massachusetts, have jointly invented a certain new and useful Chart for Use in Cutting Garments, of which the following is a specification, reference being had to the accompanying drawings.

Our purpose is to provide a simple form of chart whereby tailors may lay out rapidly and accurately the body portion of coats and the like outer garments, either for ladies' or gents' wear, without the formality and delay now most commonly required in measuring the customer and then laying out and cutting out a special pattern for each garment; our present improved system or chart rendering it both possible and easy to lay out instantly from a single chart garments suitable for persons of all ages, with accuracy, or patterns for the same.

Our said chart is illustrated in and by the annexed drawing, in which—

Figure 1:
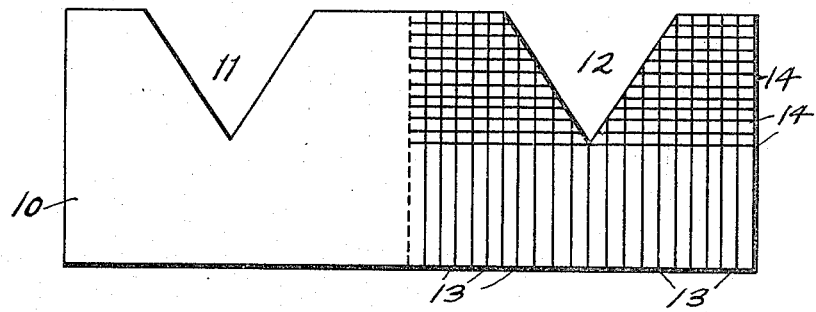
Figure 2:
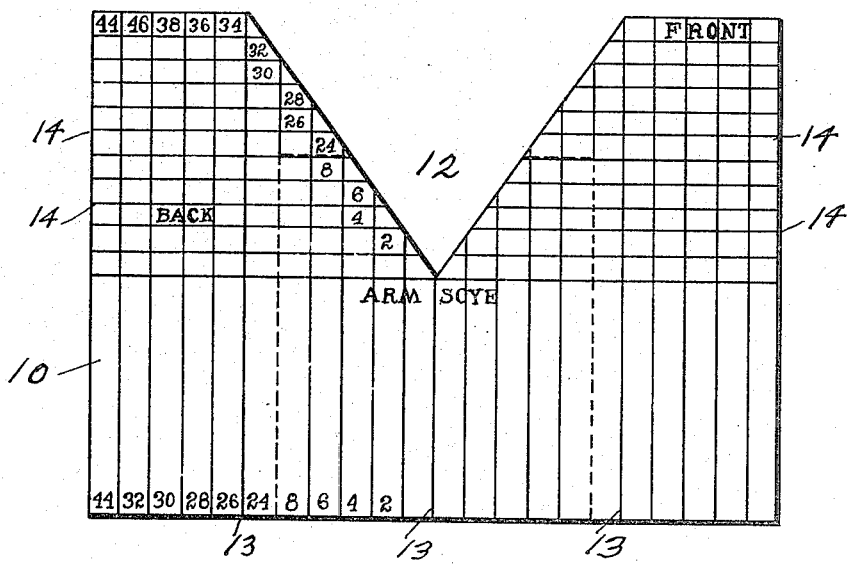

Figure 1 is a plan view of the same and Fig. 2 shows the same doubled upon itself.

The said chart may be made of paper or any other suitable material. As here shown, it is specially designed for laying out a one-piece garment; that is to say a garment, of coat style, in which the body portion is formed of a single piece of fabric.

By preference the said chart, or rather the sheet upon which it is delineated, is of the full size of the largest garment to be cut, although it is only necessary that the chart proper shall be printed, or otherwise indicated, on one half part of the sheet as the cloth, after having been folded upon itself, may be marked directly from the chart in the case of certain kinds of fabrics, or paper patterns may be produced from the chart by the use of a tracing wheel which is caused to traverse the proper lines of the chart, according to the ages or sizes indicated on the chart. For example, if it is desired to cut a one-piece garment suitable for a child four years of age, the chart is traced along the right angular lines marked "4 yrs.", which will result in outlining the proper length, bust-measure and arm-scye for a normal child of that age. Above the age of eight years, as here indicated, the bust measure is given instead of the age.

In the drawings the numeral 10 indicates the chart as a whole, the same being notched at one edge portion, as at 11 and 12, to form the "arm-scyes" for the location of the sleeves. The vertical lines 13 denote the width, or girth, of the garment and the horizontal lines 14 denote the length of the garment.

In using our described chart for cutting a garment the lower edge of said chart is placed at the lower edge of the cloth to be cut, the cloth being, preferably, doubled upon itself, as it is only necessary then to lay out one half of the garment. As stated above, if a garment is to be cut for a normal child of eight years, the cloth is marked to be cut along the dotted lines in Fig. 2. This will result in cutting out the entire body portion of the garment, and with practically no waste of material, as we find in practice that the piece which is cut out for the arm-scyes is, ordinarily, of sufficient size to be utilized in getting out the sleeves.

Our described chart, and method of cutting garments, have decided advantages over the ordinary system of cutting the cloth into a plurality of sections and then sewing them together again, as there are no stitched seams in our garment to "draw" and wrinkle, the operations of laying out and cutting are performed almost instantly as no special calculating or designing is required, and the system is particularly economical of material as we are able to effect a saving of fully one third of material owing to the absence of wide, overlapping seams and cut-out portions for the purpose of close fitting, etc.

Having thus described our invention, we claim as new and wish to secure by Letters Patent:—

A chart of the class referred to having arm-scye notches of predetermined size for garments of a plurality of sizes, vertical lines spaced equal distances and numbered to indicate the place to cut for persons of certain ages or bust measures for indicating the girth of a garment, and suitably proportioned horizontal lines starting from the apex and having likewise indicating marks or numbers to show the place to cut for persons of certain ages or bust measure to indicate the length of the garment.

MARY CAROLINE MURPHY.
MARY CAROLINE MURPHY, Jr.

Witnesses:
 FRANK H. ALLEN,
 HARRY C. DAGGETT.

Copies of this patent may be obtained for five cents each, by addressing the "Commissioner of Patents, Washington, D. C."